United States Patent
Khatri et al.

(10) Patent No.: US 10,649,943 B2
(45) Date of Patent: May 12, 2020

(54) SYSTEM AND METHOD FOR I/O AWARE PROCESSOR CONFIGURATION

(71) Applicant: DELL PRODUCTS, LP, Round Rock, TX (US)

(72) Inventors: Mukund P. Khatri, Austin, TX (US); Vijay Bharat Nijhawan, Austin, TX (US)

(73) Assignee: Dell Products, L.P., Round Rock, TX (US)

(*) Notice: Subject to any disclaimer, the term of this patent is extended or adjusted under 35 U.S.C. 154(b) by 20 days.

(21) Appl. No.: 15/606,804

(22) Filed: May 26, 2017

(65) Prior Publication Data
US 2018/0341614 A1 Nov. 29, 2018

(51) Int. Cl.
| | |
|---|---|
| G06F 9/30 | (2018.01) |
| G06F 13/40 | (2006.01) |
| G06F 15/80 | (2006.01) |
| G06F 13/42 | (2006.01) |
| G06F 9/4401 | (2018.01) |

(52) U.S. Cl.
CPC ........ G06F 13/4068 (2013.01); G06F 9/4405 (2013.01); G06F 13/4282 (2013.01); G06F 15/80 (2013.01); *G06F 2213/0026* (2013.01)

(58) Field of Classification Search
CPC ..... G06F 13/4068; G06F 9/4403; G06F 13/24
See application file for complete search history.

(56) References Cited

U.S. PATENT DOCUMENTS

| | | | |
|---|---|---|---|
| 7,596,654 B1* | 9/2009 | Wong | G06F 12/0813 703/21 |
| 7,702,743 B1* | 4/2010 | Wong | G06F 12/0284 709/216 |
| 8,190,864 B1 | 5/2012 | Jordan et al. | |
| 9,496,633 B1* | 11/2016 | Huang | G06F 1/185 |
| 2002/0087652 A1* | 7/2002 | Davis | G06F 9/5016 709/213 |
| 2006/0117200 A1 | 6/2006 | Bailey et al. | |
| 2007/0233967 A1* | 10/2007 | Rangarajan | G06F 12/0646 711/147 |
| 2008/0320236 A1* | 12/2008 | Ueda | G06F 12/0831 711/146 |
| 2010/0251234 A1* | 9/2010 | Oshins | G06F 9/4856 718/1 |
| 2011/0107031 A1 | 5/2011 | Anand et al. | |

(Continued)

*Primary Examiner* — Hyun Nam
(74) *Attorney, Agent, or Firm* — Larson Newman, LLP

(57) ABSTRACT

An information handling system includes an I/O device, a first processor die coupled to the I/O device, a second processor die coupled to the first processor die, and to no I/O device, and boot process logic. The boot process logic determines that the first processor die is coupled to the I/O device and that the second processor die is coupled to no I/O device, determines that an operating environment of the information handling system is capable of utilizing a maximum of Z processor cores, where Z is an integer number that is greater than X and less than the sum of X+Y, and enables Z processor cores on the first and second processor dies by enabling the X processor cores on the first processor die, and enabling the remainder of cores, equal to Z−X, on the second processor die, based upon the determination that the second processor die is coupled to no I/O device.

18 Claims, 6 Drawing Sheets

(56) References Cited

U.S. PATENT DOCUMENTS

| | | | | |
|---|---|---|---|---|
| 2014/0095561 A1* | 4/2014 | Wegener | ............... | H03M 7/30 |
| | | | | 708/203 |
| 2014/0244943 A1 | 8/2014 | Jacobs et al. | | |
| 2014/0351608 A1* | 11/2014 | Mozipo | ............... | G06F 1/26 |
| | | | | 713/300 |
| 2015/0113214 A1* | 4/2015 | Sutardja | ............ | G06F 12/0868 |
| | | | | 711/106 |
| 2015/0234640 A1* | 8/2015 | Tian | ............ | G06F 8/451 |
| | | | | 710/267 |

* cited by examiner

| Performance Mode | | | | | | | |
|---|---|---|---|---|---|---|---|
| Node | Die | DIMMs | I/O | Node | Die | DIMMs | I/O |
| PXM (1) | 510 | 512 | 514 | PXM (5) | 550 | 552 | 554 |
| PXM (2) | 520 | 522 | 524 | PXM (6) | 560 | 562 | 564 |
| PXM (3) | 530 | 532 | 534 | PXM (7) | 570 | 572 | 574 |
| PXM (4) | 540 | 542 | 544 | PXM (8) | 580 | 582 | 584 |

502

SYSTEM AND METHOD FOR I/O AWARE PROCESSOR CONFIGURATION

FIELD OF DISCLOSURE

This disclosure generally relates to information handling systems, and more particularly relates to I/O aware processor configuration in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system can include an I/O device, a first processor die coupled to the I/O device, and a second processor die coupled to the first processor die. Boot process logic can determine that the first processor die is coupled to the I/O device and that the second processor die is coupled to no I/O device, determine that an operating environment of the information handling system is capable of utilizing a maximum of Z processor cores, where Z is an integer number that is greater than X and less than the sum of X+Y, and enable Z processor cores on the first and second processor dies by enabling the X processor cores on the first processor die, and enabling the remainder of cores, equal to Z−X, on the second processor die, based upon the determination that the second processor die is coupled to no I/O device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
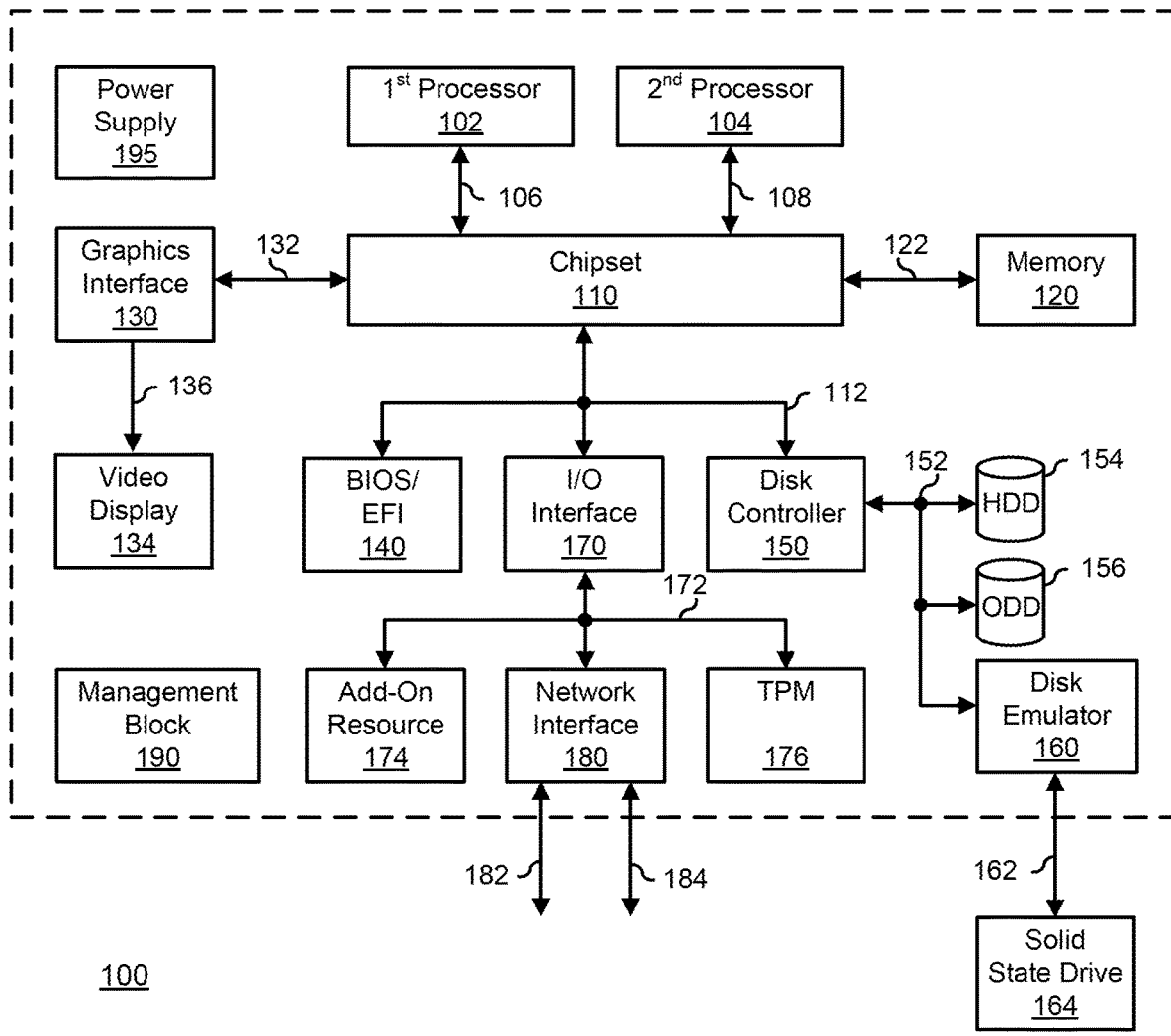
FIG. 1 is a block diagram illustrating a generalized information handling system according to an embodiment of the present disclosure.

FIG. 1 illustrates a generalized embodiment of an information handling system 100. For purpose of this disclosure information handling system 100 can be configured to provide the features and to perform the functions of the OPF system as described herein. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below, and operates to perform one or more of the methods described below. Information handling system 100 includes a processors 102 and 104, a chipset 110, a memory 120, a graphics interface 130, a basic input and output system/extensible firmware interface (BIOS/EFI) module 140, a disk controller 150, a hard disk drive (HDD) 154, an optical disk drive (ODD) 156, a disk emulator 160 connected to an external solid state drive (SSD) 162, an input/output (I/O) interface 170, one or more add-on resources 174, a trusted platform module (TPM) 176, a network interface 180, a management block 190, and a power supply 195. Processors 102 and 104, chipset 110, memory 120, graphics interface 130, BIOS/EFI module 140, disk controller 150, HDD 154, ODD 156, disk emulator 160, SSD 162, I/O interface 170, add-on resources 174, TPM 176, and network interface 180 operate together to provide a host environment of information handling system 100 that operates to provide the data processing functionality of the information handling system. The host environment operates to execute machine-executable code, including platform BIOS/EFI code, device firmware, operating system code, applications, programs, and the like, to perform the data processing tasks associated with information handling system 100.

In the host environment, processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Management block 190 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 100. In particular, management block 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management block 190 can include a network connection to an external management system, and the management block can communicate with the management system to report status information for information handling system 100, to receive BIOS/UEFI or system firmware updates, or to perform other task for managing and controlling the operation of information handling system 100. Management block 190 can operate off of a separate power plane from the components of the host environment so that the management block receives power to manage information handling system 100 when the information handling system is otherwise shut down. An example of management block 190 may include a commercially available BMC product that operates in accordance with an Intelligent Platform Management Initiative (IPMI) specification, such as an Integrated Dell Remote Access Controller (iDRAC), or the like. Management block 190 may further include associated memory devices, logic devices, security devices, or the like, as needed or desired.

Power supply 195 represents one or more devices for power distribution to the components of information handling system 100. In particular, power supply 195 can include a main power supply that receives power from an input power source, such as a wall power outlet, a power strip, a battery, or another power source, as needed or desired. Here, power source 195 operates to convert the power at a first voltage level from the input power source to one or more power rails that are utilized by the components of information handling system. Power supply 195 can also include one or more voltage regulators (VRs) that each receive power from the main power supply and that operate to convert the input voltage to an output voltage that is used by one or more components of information handling system. For example, a VR can be provided for each of processors 102 and 104, and another VR can be provided for memory 120. Power supply 195 can be configured to provide a first power plane that provides power to the host environment, and to provide a second power plane that provides power to the management environment.

Figure 2:
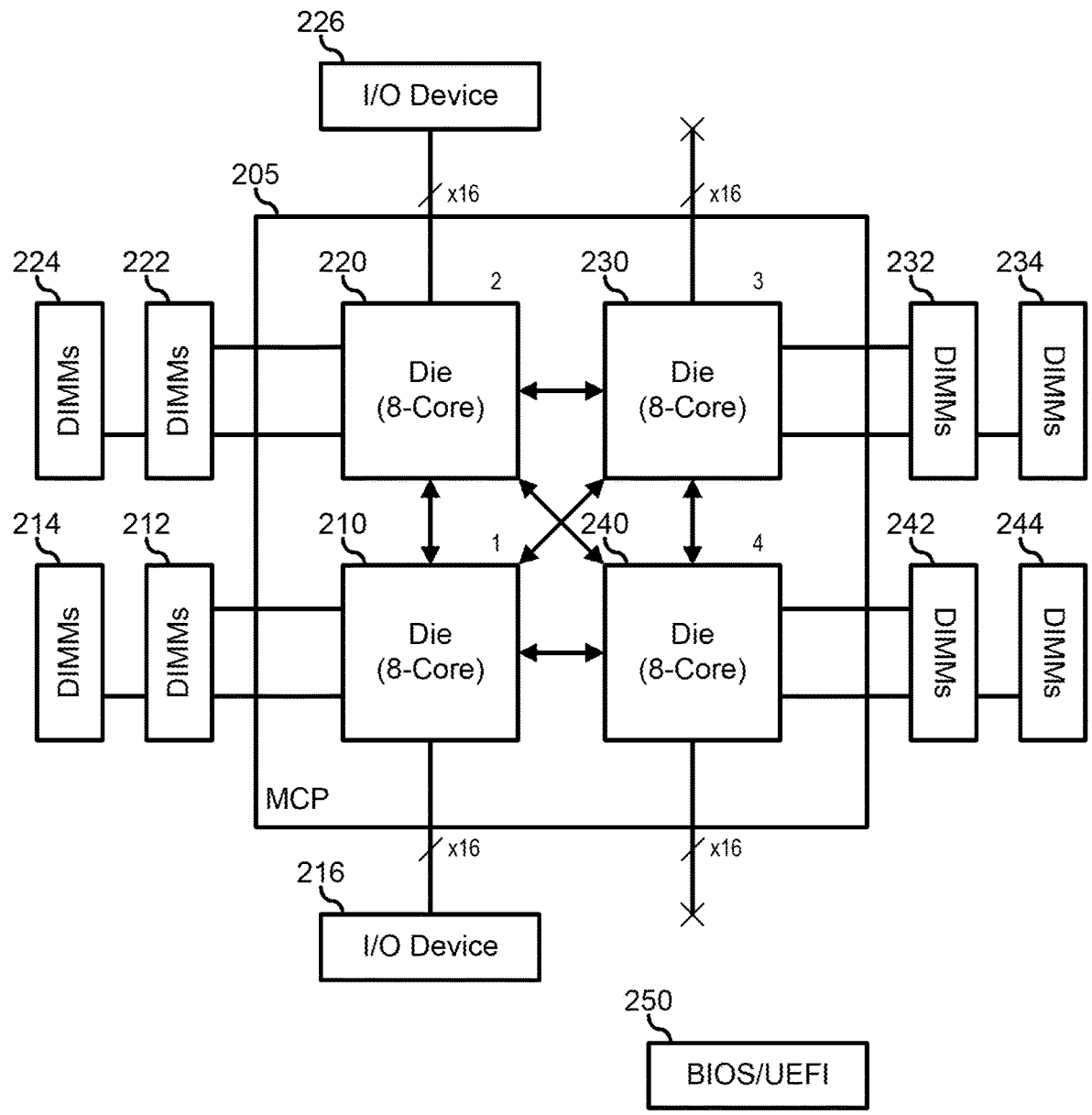
FIG. 2 illustrates an information handling system configured to provide for selective enablement of processor cores based on I/O device affinity information according to an embodiment of the present disclosure.

FIG. 2 illustrates an information handling system 200 similar to information handling system 100. The architecture of information handling system 200 includes a multi-chip processor (MCP) 205, and a system Basic Input/Output System (BIOS)/Universal Extensible Firmware Interface (UEFI) 250. MCP 205 includes four processor die 210, 220, 230, and 240 that are connected together via point-to-point data links, such that processor die 210 is connected to processor die 220 via a first point-to-point data link, to processor die 230 via a second point-to-point data link, and to processor die 240 via a third point-to-point data link. Similarly, processor die 220 is connected to processor die 230 via a fourth point-to-point data link and to processor die 240 via a fifth point-to-point data link, and finally, processor die 230 is connected to processor die 240 via a sixth point-to-point data link. An example of the point-to-point data links include a coherent fabric between processor dies 210, 220, 230, and 240, such as a Global Memory Interconnect (GMI) fabric. Each of processor die 210, 220, 230, and 240 includes eight processor cores. Each core can process up to two threads. Thus MCP 205 can process up to 64 threads simultaneously.

Information handling system 200 provides a Non-Uniform Memory Access (NUMA) architecture, where each of processor dies 210, 220, 230, and 240 support two memory channels. As such, information handling system 200 is shown with processor die 210 connected to Dual In-Line Memory Modules (DIMMs) 212 and 214, with processor die 220 connected to DIMMs 222 and 224, with processor die 230 connected to DIMMs 232 and 234, and with processor die 240 connected to DIMMs 242 and 244. An example of memory channels and associated DIMMs 212, 214, 222, 224, 232, 234, 242, and 244 includes memory devices in accordance with a Double Data Rate (DDR) DIMM standard, such as a DDR-4 standard, a DDR-5 standard, or another DDR standard. DIMMs 212, 214, 222, 224, 232, 234, 242, and 244 do not necessarily represent a full population of DIMM modules. For example, each of DIMMs 212, 214, 222, 224, 232, 234, 242, and 244 may, in fact represent two or four DIMM sockets per memory channel, each of which may or may not actually be populated with a DIMM device in a particular configuration of information handling system 200. For example, information handling system 200 may be configured to provide an optimal level of system performance at a minimum cost, and so my be configured with only one DIMM module per memory channel, leaving 1-3 DIMM sockets unpopulated and available for future expansion.

Each of processor die 210, 220, 230, and 240 further supports one 16 lane (x16) serial data interface. The x16 serial data interfaces are highly configurable, supporting several different interface configuration protocols and data rates, as needed or desired. For example, the x16 serial data interfaces may each be configured in accordance with various Peripheral Component Interconnect Express (PCIe) standards, and groups of serial data lanes can be logically configured as x16 PCIe serial data interfaces, as x8 serial data interfaces, as x4 serial data interfaces, as x2 serial data interfaces, or as x1 serial data interfaces, as needed or desired. Limitations on permissible configurations are known in the art, as may be dictated by BIOS considerations, PCIe specification considerations, or other considerations, and will not be further discussed herein. Some or all of the serial data lanes of the x16 serial data interfaces may also be configured in accordance with various Serial-ATA (SATA), SATA-Express, or Ethernet port standards, as needed or desired, and as supported by the various architecture standards for information handling system 200. As illustrated, information handling system 200 is shown with processor die 210 connected to an I/O device 216, and with processor die 220 connected to an I/O device 226. As further illustrated, processor dies 230 and 240 are not shown as being connected to I/O devices. This embodiment will be considered further, below as illustrative of the teachings of the present disclosure, but it will be noted that other I/O device configurations may be provided without violating the teachings of the present disclosure.

Figure 3:
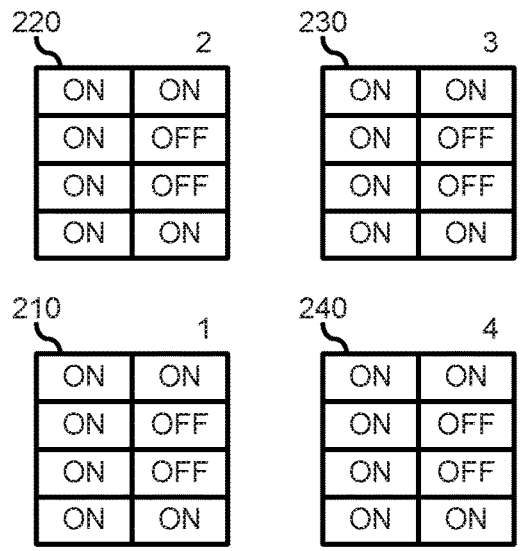
FIG. 3 illustrates various processor core enablement configurations in the information handling system of FIG. 2.
Figure 3:
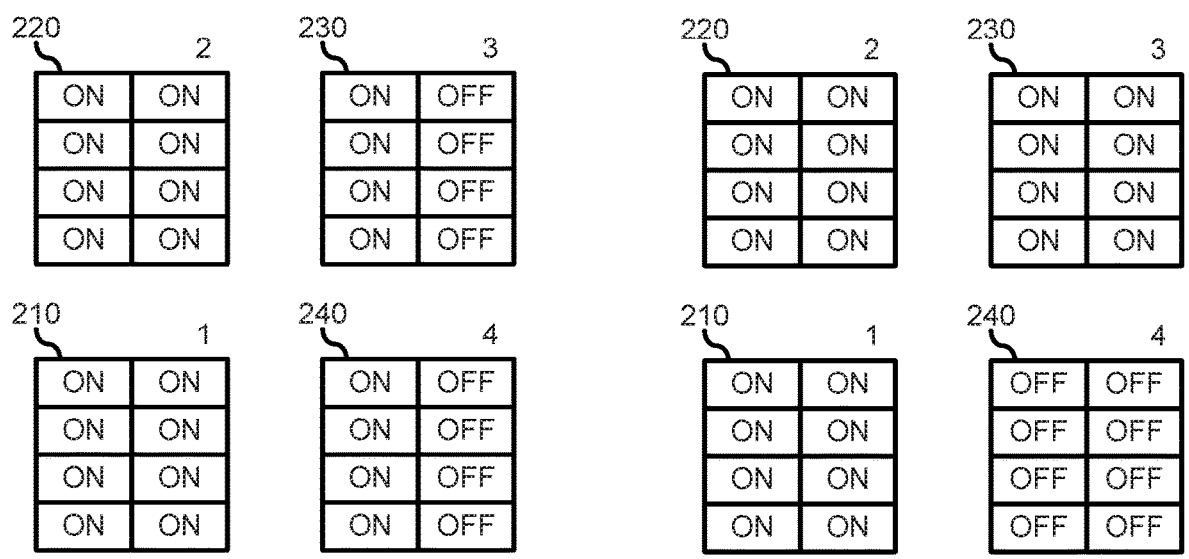

In the NUMA architecture provided by information handling system 200, mapping of processes and threads to the cores of processor dies 210, 220, 230, and 240 is performed based upon information that relates to the configuration of the information handling system. In particular, the locations of DIMMS 212, 214, 222, 224, 232, 234, 242, and 244, with respect to the processor dies is determined based upon several measures, and an operating system (OS) allocates threads to the processor cores of processor dies 210, 220, 230, and 240 based upon the measures. However, various operating environments may not be capable of utilizing all of the processing resources of MCP 205. An operating environment may include an OS, a virtual machine manager (VMM), system BIOS/UEFI 250, an application or program, or other resources which utilize processing resources. For example, BIOS/UEFI 250, or an OS may be limited as to the number of cores that can be utilized by the BIOS/UEFI or OS. In another example, a program may be limited as to the number of threads that the application can spawn. Under a typical NUMA architecture, when the number of cores or threads supported by the operating environment is limited, a number of cores that is equal to the excess number of cores will be disabled by BIOS/UEFI 250. For example, if the operating environment only supports 24 cores, then BIOS/UEFI 250 will disable eight (8) cores on MCP 205. Further, under the typical NUMA architecture, the disabled cores will be divided among processor dies 210, 220, 230, and 240. Continuing the above example, BIOS/UEFI 250 will disable two (2) cores in each of processor dies 210, 220, 230, and 240, leaving six (6) cores per processor die enabled. In particular, BIOS/UEFI 250 accesses various elements of an Advanced Configuration and Power Interface (ACPI) system, including a Static Resource Affinity Table (SRAT) and a System Locality Information Table (SLIT), to allocate the cores of processor dies 210, 220, 230, and 240 based upon the location and proximity of each core to the various DIMMs 212, 214, 222, 224, 232, 234, 242, and 244. FIG. 3 illustrates various processor core enablement configurations under the NUMA architecture as described herein. The configuration 300 illustrates the processor core enablement configuration under the typical NUMA architecture implementation.

In a particular embodiment, in addition to reporting core-to-memory affinities in the ACPI tables, BIOS/UEFI 250 reports the core-to-IO affinities of the I/O devices that are populated in information handling system 200. Here, where information handling system 200 is only populated with I/O devices 216 and 226, BIOS/UEFI 250 provides indications that the eight (8) cores of processor die 210 are most closely proximate to I/O device 216, that the eight (8) cores of processor die 220 are most closely proximate to I/O device 226, and that the eight (8) cores of each of processor dies 230 and 240 are more remote from the I/O devices. In this embodiment, when the number of cores or threads supported by the operating environment is limited, a number of cores that is equal to the excess number of cores will be disabled by BIOS/UEFI 250. However, here, the cores that are more remote from I/O devices 216 and 226 will be disabled, preferentially over the cores that are more proximate to the I/O devices. Hence, continuing the above example, BIOS/UEFI 250 will disable eight (8) cores on processor dies 230 and 240, while leaving all cores on processor dies 210 and 220 enabled. In a particular embodiment, BIOS/UEFI 250 will disable the processor cores evenly on processor dies 230 and 240, such that four (4) cores are disabled on each processor die. The configuration 302 illustrates the processor core enablement where all eight (8) of the processor cores are enabled on processor dies 210 and 220, and four (4) processor cores are enabled on each of processor dies 230 and 240, for a total of 24 enabled cores, while four (4) processor cores are disabled on the processor dies 230 and 240. In another embodiment, BIOS/UEFI 250 will disable the processor cores preferentially on a selected processor die, such as processor die 240, as illustrated in the configuration 304. Here, all eight (8) of the processor cores are enabled on processor dies 210, 220, and 230, and all eight of the processor cores are disabled on processor die 240.

Note that some elements of the operating environment may function to dictate a maximum number of processor cores that can be enabled, based upon the functionality of the particular elements. For example, where the system BIOS/UEFI or OS are configured to operate a particular number of cores or threads, then the system BIOS/UEFI can provide a default configuration based upon the core-to-IO affinity information. For example, as above, where a system BIOS/UEFI or OS only supports 24 processor cores, the default configuration can be provided by the system BIOS/UEFI in accordance with one of configurations 302 or 304. However, in addition to considerations as to the maximum number of processor cores that can be enabled, as a practical matter, a lesser number of processor cores may be enabled at a particular time, based upon a maximum number of cores that can be utilized by a particular program or application that is instantiated on information handling system 100. For example, a particular application instantiated on information handling system 100 may only be configured to utilize 16 processor cores. Here, based upon the core-to-IO affinity information, BIOS/UEFI 250 will only enable the eight (8) cores on each of processor dies 210 and 220, and will disable the eight (8) cores on each of processor cores 230 and 240. At a later time, a different program or application that is configured to utilize additional processor cores or thread can be instantiated on information handling system 100. Here BIOS/UEFI 250 will enable additional processor cores as demanded by the new program or application, up to the maximum number of cores that are permitted to be enabled by the BIOS/UEFI or OS, as described above.

By considering the core-to-IO affinity information to preferentially disable processor cores that are more remote from the I/O devices on an information handling system, the operating performance of the information handling system is improved, because more cores that are more proximate to the I/O devices are enabled. In a particular embodiment, BIOS/UEFI 250 determines a type of operational preference for a particular program or application, and determines whether to utilize the core-to-IO affinity information based upon the operational preference. For example, where the program or application utilizes a higher degree of memory operations as compared with the I/O operations, BIOS/UEFI 250 may utilize the typical NUMA architecture to more evenly balance the disablement of the processor cores in order to more fully take advantage of the installed DIMMs 232, 234, 242, and 244. Further, where the program or application utilizes a higher degree of I/O operations as compared with the memory operations, BIOS/UEFI 250 may utilize the core-to-IO affinity information.

Figure 4:
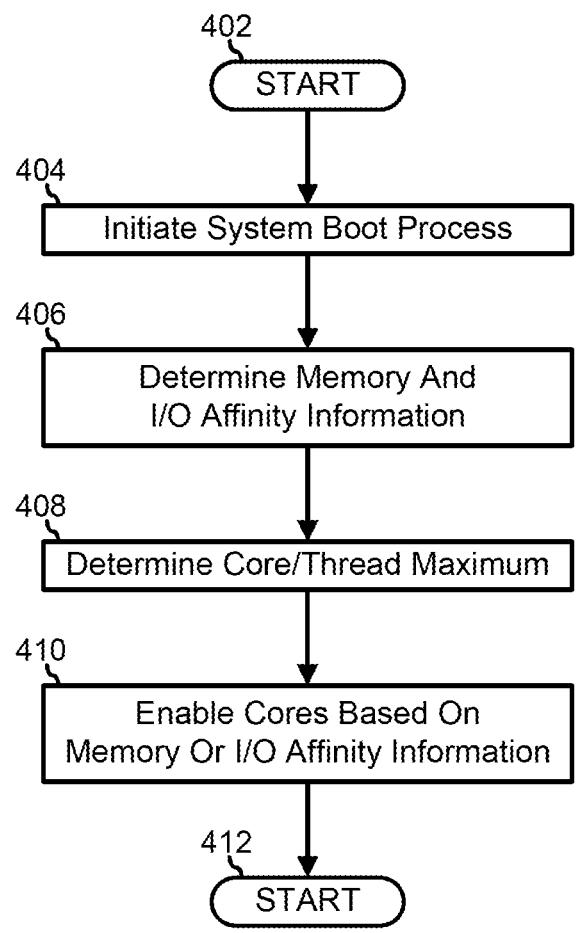
FIG. 4 illustrates a method for selective enablement of processor cores based on I/O device affinity information according to an embodiment of the present disclosure.

FIG. 4 illustrates a method for selective enablement of processor cores based on I/O device affinity information beginning at block 402. A system boot process is initiated on an information handling system in block 404. For example, BIOS/UEFI 250 can initiate a system boot process on information handling system 200. Memory and I/O affinity information is determined as part of the system boot process in block 406. For example, during the system boot process, BIOS/UEFI 250 can determine the topology of information handling system 200, including determining the population of DIMMs 212, 214, 222, 224, 232, 234, 242, and 244 and the population of I/O devices 216 and 226 as a function of the proximity to processor dies 210, 220, 230, and 240. The ACPI tables can be provided with the core-to-memory information and the core-to-IO information as a part of the system boot process. A maximum number of processor cores or threads that can be supported is determined in block 408. For example, BIOS/UEFI 250 can determine that some portion of the operating environment of information handling system 200, such as the system BIOS/UEFI or OS, has a limit as to the maximum number of processor cores or threads that can be supported. Processor cores are enabled based upon one or more of the core-to-memory information or the core-to-I/O information in block 410, and the method ends in block 412. For example, BIOS/UEFI 250 can be configured to select a typical NUMA mode in which core-to-memory affinity information is utilized to disable cores across all of processor dies 210, 220, 230, and 240, or the BIOS/UEFI can be configured to select the modified NUMA mode in which core-to-IO affinity information is utilized to disable cores in processor dies 230 and 240, based upon their being more remote from I/O devices 216 and 226.

Figure 5:
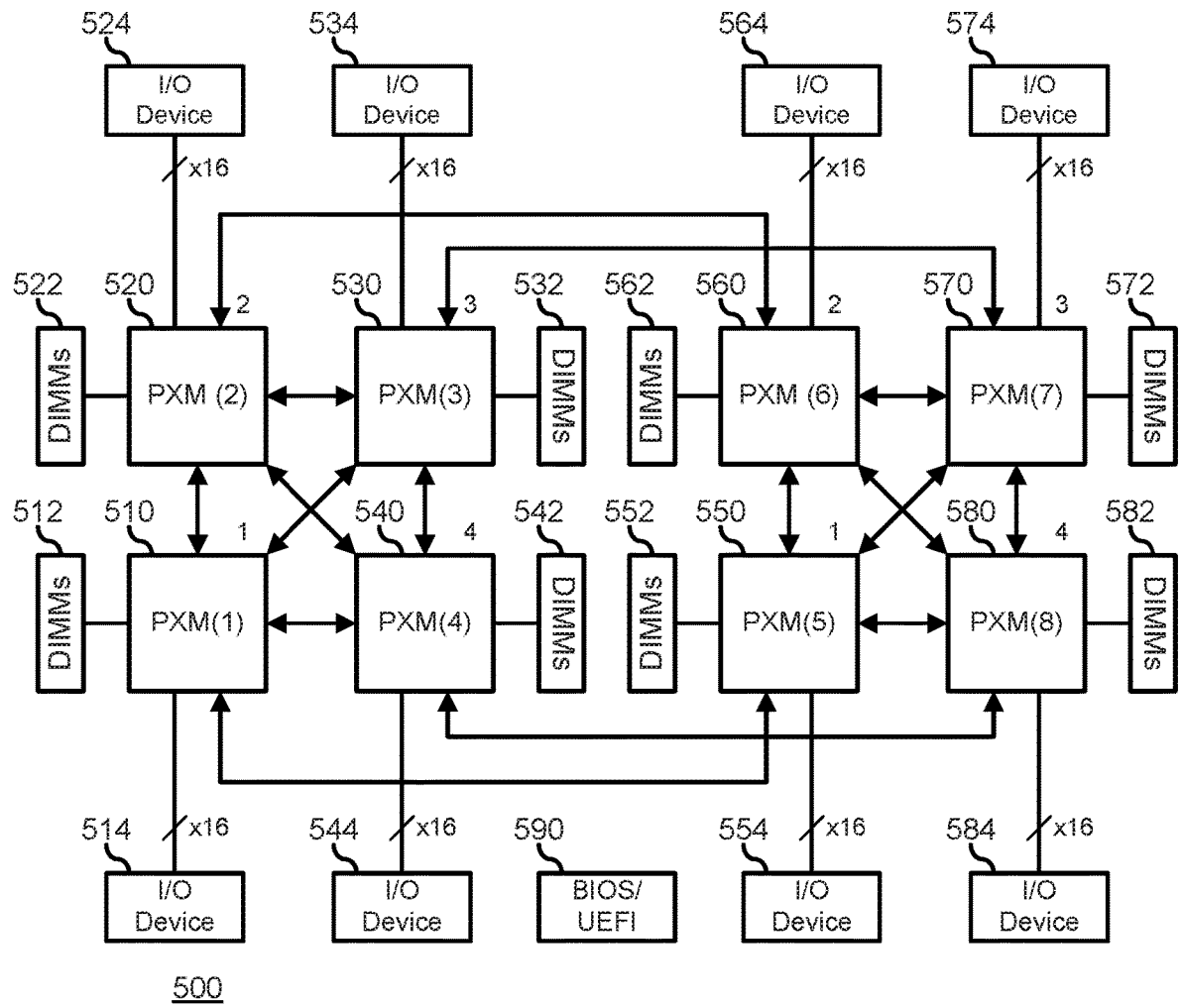
FIGS. 5 and 6 illustrate an information handling system configured to provide different proximity domains for a performance mode and a performance per watt mode according to an embodiment of the present disclosure.

FIG. 5 illustrates an information handling system 500 similar to information handling system 200. The architecture of information handling system 500 includes twos MCPs, and a BIOS/UEFI 590. The first MCP includes four processor die 510, 520, 530, and 540 that are connected together via point-to-point data links, such that processor die 510 is connected to processor die 520 via a first point-to-point data link, to processor die 530 via a second point-to-point data link, and to processor die 540 via a third point-to-point data link. Similarly, processor die 520 is connected to processor die 530 via a fourth point-to-point data link and to processor die 540 via a fifth point-to-point data link, and finally, processor die 530 is connected to processor die 540 via a sixth point-to-point data link. Similarly, the second MCP includes four processor die 550, 560, 570, and 580 that are connected together via point-to-point data links, such that processor die 550 is connected to processor die 560 via a seventh point-to-point data link, to processor die 570 via an eighth point-to-point data link, and to processor die 580 via a ninth point-to-point data link. Similarly, processor die 560 is connected to processor die 570 via a tenth point-to-point data link and to processor die 580 via a eleventh point-to-point data link, and finally, processor die 570 is connected to processor die 580 via a twelfth point-to-point data link. An example of the point-to-point data links include a coherent fabric between processor dies 510, 520, 530, and 540 and between processor dies 550, 560, 570, and 580, such as a GMI fabric. An example of the point-to-point data links between processor dies 510 and 550, between processor dies 520 and 560, between processor dies 530 and 570, and between processor dies 540 and 580 include a Graphics Output Protocol (GOP) fabric. Each of processor die 510, 520, 530, 540, 550, 560, 570, and 580 includes eight processor cores. Each core can process up to two threads. Thus information handling system 500 can process up to 128 threads simultaneously.

Each of processor dies 510, 520, 530, 540, 550, 560, 570, and 580 support two memory channels. Information handling system 500 is shown with processor die 510 connected to a single DIMM 512 for simplicity of illustration, but it will be understood that DIMM 512 may represent more than a single module and more than one memory channel. Similarly, information handling system 500 is shown with processor die 520 connected to DIMM 522, with processor die 530 connected to DIMM 532, with processor die 540 connected to DIMM 542, with processor die 550 connected to DIMM 552, with processor die 560 connected to DIMM 562, with processor die 570 connected to DIMM 572, and with processor die 580 connected to DIMM 582. An example of memory channels and associated DIMMs 512, 522, 532, 542, 552, 562, 572, and 582 includes memory devices in accordance with a DDR DIMM standard, such as a DDR-4 standard, a DDR-5 standard, or another DDR standard. DIMMs 512, 522, 532, 542, 552, 562, 572, and 582 do not necessarily represent a full population of DIMM modules. For example, each of DIMMs 512, 522, 532, 542, 552, 562, 572, and 582 may, in fact represent two or four DIMM sockets per memory channel, each of which may or may not actually be populated with a DIMM device in a particular configuration of information handling system 500. For example, information handling system 500 may be configured to provide an optimal level of system performance at a minimum cost, and so my be configured with only one DIMM module per memory channel, leaving 1-3 DIMM sockets unpopulated and available for future expansion.

Each of processor die 510, 520, 530, 540, 550, 560, 570, and 580 further supports one 16 lane (x16) serial data interface. The x16 serial data interfaces are highly configurable, supporting several different interface configuration protocols and data rates, as needed or desired. For example, the x16 serial data interfaces may each be configured in accordance with various PCIe standards, and groups of serial data lanes can be logically configured as x16 PCIe serial data interfaces, as x8 serial data interfaces, as x4 serial data interfaces, as x2 serial data interfaces, or as x1 serial data interfaces, as needed or desired. Limitations on permissible configurations are known in the art, as may be dictated by BIOS considerations, PCIe specification considerations, or other considerations, and will not be further discussed herein. Some or all of the serial data lanes of the x16 serial data interfaces may also be configured in accordance with various Serial-ATA (SATA), SATA-Express, or Ethernet port standards, as needed or desired, and as supported by the various architecture standards for information handling system 500. As illustrated, information handling system 500 is shown with processor die 510 connected to an I/O device 514, with processor die 520 connected to an I/O device 524, with processor die 530 connected to an I/O device 534, with processor die 540 connected to an I/O device 544, with processor die 550 connected to an I/O device 554, with processor die 560 connected to an I/O device 564, with processor die 570 connected to an I/O device 574, and with processor die 580 connected to an I/O device 584. Note that other I/O device configurations may be provided without violating the teachings of the present disclosure.

In the NUMA architecture provided by information handling system 500, mapping of processes and threads to the cores of processor dies 510, 520, 530, 540, 550, 560, 570, and 580 is performed based upon information that relates to the configuration of the information handling system and upon predetermined groupings of the processor cores, DIMMs 512, 522, 532, 542, 552, 562, 572, and 582, and I/O devices 514, 524, 534, 544, 554, 564, 574, and 584, as defined by various elements of the ACPI system implemented by BIOS/UEFI 590. In particular, the processor cores, DIMMs 512, 522, 532, 542, 552, 562, 572, and 582, and I/O devices 514, 524, 534, 544, 554, 564, 574, and 584 are grouped together in proximity domains based upon various usage models employed by information handling system 500. In a particular embodiment, when a highest overall performance level of information handling system 500 is desired, BIOS/UEFI 590 operates the information handling system in a performance mode that instantiates a set of proximity domains as shown in the Performance Mode table 502. Here, a first proximity domain PXM(1) associates the processor cores of processor die 510 with DIMMs 512 and I/O device 514, a second proximity domain PXM(2) associates the processor cores of processor die 520 with DIMMs 522 and I/O device 524, a third proximity domain PXM(3) associates the processor cores of processor die 530 with DIMMs 532 and I/O device 534, a fourth proximity domain PXM(4) associates the processor cores of processor die 540 with DIMMs 542 and I/O device 544, a fifth proximity domain PXM(5) associates the processor cores of processor die 550 with DIMMs 552 and I/O device 554, a sixth proximity domain PXM(6) associates the processor cores of processor die 560 with DIMMs 562 and I/O device 564, a seventh proximity domain PXM(7) associates the processor cores of processor die 570 with DIMMs 572 and I/O device 574, and an eighth proximity domain PXM(8) associates the processor cores of processor die 580 with DIMMs 582 and I/O device 584.

In the performance mode, the operating environment of information handling system 500 operates to load thread or processes onto the processor cores 510, 520, 530, 540, 550, 560, 570, and 580 in such a way that the resources of the information handling system that are most utilized by the various threads and processes are most proximate to the selected processor cores. For example, a previously instantiated thread may have been launched on a processor core of processor die 510 because memory space was available in DIMMs 512, and because the thread was expected to heavily utilize I/O device 514, and so the operating environment instantiated the thread on proximity domain PXM(1). Then, when a new thread that is similar to the previous thread is to be instantiated on information handling system 500, the operating environment can select an available processor core on processor die 510 because the new thread is expected to utilize overlapping memory regions with the previous thread. In this way, the overall performance level of information handling system 500 is improved because long latency data paths are avoided based upon the available proximity domains PXM(1), PXM(2), PXM(3), PXM(4), PXM(5), PXM(6), PXM(7), and PXM(8).

Figure 6:
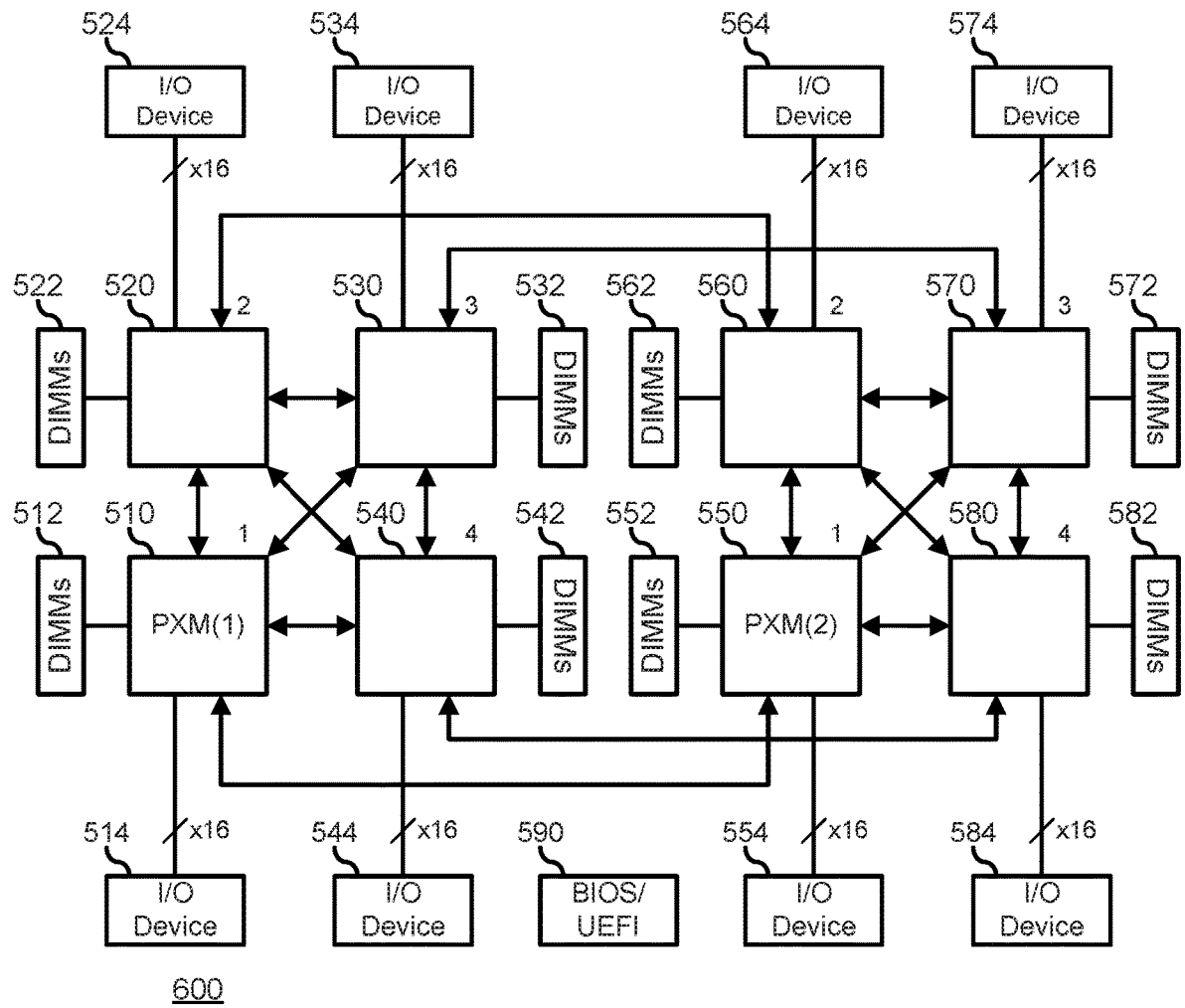

FIG. 6 illustrates information handling system 500 as configured in two proximity domains PXM(1) and PXM(2). Here, when an energy saving highest overall performance level per watt of information handling system 500 is desired, BIOS/UEFI 590 operates the information handling system in a performance per watt mode that instantiates a set of proximity domains as shown in the Performance Per Watt Mode table 602. Here, a first proximity domain PXM(1) associates the processor cores of processor dies 510, 520, 530, and 540, with DIMMs 512, 522, 532, and 542, and with I/O devices 514, 524, 534, and 544, and a second proximity domain PXM(2) associates the processor cores of processor dies 550, 560, 570, and 580, with DIMMs 552, 562, 572, and 582, and with I/O devices 554, 564, 574, and 584. In the performance per watt mode, the operating environment of information handling system 500 operates to load thread or processes onto the processor cores 510, 520, 530, 540, 550, 560, 570, and 580 in such a way that the resources of the information handling system that are most utilized by the various threads and processes are most concentrated on a particular processor die. In this way, threads or processes are instantiated first on processor cores of processor dies 510 and 550, until all processor cores on processor dies 510 and 550 are utilized. Then, only after all processor cores on, for example, processor die 510 are utilized, processor cores on a next most proximate processor die, for example on processor die 520 or 540, will be utilized. In this way, further only as a particular processor die becomes fully utilized will the processor cores on a new processor die be utilized. This results in much less power usage because the amount of power saved by shutting down an entire processor die is greater than simply shutting down an equal number of processor cores across multiple processor dies.

Note that, in the context of information handling system 500 as described above, the notion of instantiating threads on the various processor cores is separate and distinct from the notion of enabling processor cores as described above in the context of information handling system 200. In information handling system 500, it may be assumed that all processor cores on processor dies 510, 520, 530, 540, 550, 560, 570, and 580 are enabled, but this is not necessarily so, and the enablement or disablement of processor cores in information handling system 500 may be performed as discussed above, that is, in accordance with the typical NUMA architecture, or in accordance with the core-to-IO enablement scheme, without affecting the teachings of configuring proximity domains for performance mode operation or performance per watt mode operation, as described above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
an input/output (I/O) device;
a processor including a plurality of processor dies configured in a non-uniform memory access architecture, the processor dies including a first processor die having X processor cores and a first serial interface, wherein X is an integer number greater than one, and the first processor die is connected to the I/O device via the first serial interface, and the processor dies further including a second processor die including Y processor cores and a second serial interface, wherein Y is an integer number greater than one, the second processor die is coupled to the first processor die, and the second processor die is not connected to the I/O device via the second serial interface; and
a memory device that includes boot process logic code that:
determines that the first processor die is connected to the I/O device and that the second processor die is not connected to the I/O device;
determines that an operating environment of the information handling system is capable of utilizing a maximum of Z processor cores, where Z is an integer number that is greater than X and less than the sum of X+Y; and
enables Z processor cores on the first and second processor dies by enabling the X processor cores on the first processor die, and enabling the remainder of cores, equal to Z X, on the second processor die, based upon the determination that the second processor die is not connected to the I/O device via the second serial interface.

2. The information handling system of claim 1, wherein the second processor die is coupled to the first processor die via a Global Memory Interconnect (GMI).

3. The information handling system of claim 1, wherein X and Y are equal to 8.

4. The information handling system of claim 1, wherein the first processor die is connected to the I/O device via a serial data interface.

5. The information handling system of claim 4, wherein the serial data interface comprises a x16 Peripheral Component Interconnect-Express (PCIe) interface.

6. The information handling system of claim 1, wherein the operating environment comprises one of a system Basic Input/Output System (BIOS), a Unified Extensible Firmware Interface (UEFI), an Operating System (OS), and an application.

7. A method, comprising:
connecting a first processor die of a plurality of processor dies of a processor of an information handling system to an input/output (I/O) device via a first serial interface of the first processor die, wherein the processor dies are configured in a non-uniform memory access architecture, and wherein the first processor die includes X processor cores, X being an integer number greater than one;
coupling a second processor die of the processor dies to the first processor die, wherein the second processor die includes Y processor cores, Y being an integer number greater than one, and wherein the second processor die is not connected to the I/O device;
determining, by the information handling system, that the first processor die is connected to the I/O device and that the second processor die is not connected to the I/O device;
determining, by the information handling system, that an operating environment of the information handling system is capable of utilizing a maximum of Z processor cores, where Z is an integer number that is greater than X and less than the sum of X+Y; and
enabling, by the information handling system, the Z processor cores on the first and second processor dies by enabling the X processor cores on the first processor die, and enabling the remainder of cores, equal to Z X, on the second processor die, based upon the determination that the second processor die is not connected to the I/O device.

8. The method of claim 7, wherein the second processor die is coupled to the first processor die via a Global Memory Interconnect (GMI).

9. The method of claim 7, wherein X and Y are equal to 8.

10. The method of claim 7, wherein the first processor die is connected to the I/O device via a serial data interface.

11. The method of claim 10, wherein the serial data interface comprises a x16 Peripheral Component Interconnect-Express (PCIe) interface.

12. The method of claim 7, wherein the operating environment comprises one of a system Basic Input/Output System (BIOS), a Unified Extensible Firmware Interface (UEFI), an Operating System (OS), and an application.

13. An information handling system, comprising:
an input/output (I/O) device; and
a processor including a plurality of processor dies configured in a non-uniform memory access architecture, the processor dies including a first processor die having X processor cores and a first serial interface, wherein X is an integer number greater than one, and the first processor die is connected to the I/O device via the first serial interface, and the processor dies further including a second processor die including Y processor cores and a second serial interface, wherein Y is an integer number greater than one, the second processor die is coupled to the first processor die, and the second processor die is not connected to the I/O device via the second serial interface; and
the processor configured to:
determine that the first processor die is connected to the I/O device and that the second processor die is not connected to the I/O device;
determine that an operating environment of the information handling system is capable of utilizing a maximum of Z processor cores, where Z is an integer number that is greater than X and less than the sum of X+Y; and
enable Z processor cores on the first and second processor dies by enabling the X processor cores on the first processor die, and enabling the remainder of cores, equal to Z–X, on the second processor die, based upon the determination that the second processor die is not connected to the I/O device via the second serial interface.

14. The information handling system of claim 13, wherein the second processor die is coupled to the first processor die via a Global Memory Interconnect (GMI).

15. The information handling system of claim 13, wherein X and Y are equal to 8.

16. The information handling system of claim 13, wherein the first processor die is connected to the I/O device via a serial data interface.

17. The information handling system of claim 16, wherein the serial data interface comprises an x16 Peripheral Component Interconnect-Express (PCIe) interface.

18. The information handling system of claim 13, wherein the operating environment comprises one of a system Basic Input/Output System (BIOS), a Unified Extensible Firmware Interface (UEFI), an Operating System (OS), and an application.

* * * * *

UNITED STATES PATENT AND TRADEMARK OFFICE
CERTIFICATE OF CORRECTION

PATENT NO. : 10,649,943 B2  
APPLICATION NO. : 15/606804  
DATED : May 12, 2020  
INVENTOR(S) : Mukund P. Khatri et al.

Page 1 of 1

It is certified that error appears in the above-identified patent and that said Letters Patent is hereby corrected as shown below:

Column 13, Line 35 Claim 7: Please change "Z X" to --Z - X--

Signed and Sealed this  
Twenty-third Day of June, 2020

Andrei Iancu  
*Director of the United States Patent and Trademark Office*